United States Patent
Erickson et al.

(10) Patent No.: US 6,982,405 B2
(45) Date of Patent: Jan. 3, 2006

(54) SYSTEM AND METHOD FOR USING A PHOTODIODE TO SELF-TEST AN OPTICAL DRIVE

(75) Inventors: Dirk A. Erickson, Austin, TX (US); Munif M. Farhan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 10/425,018

(22) Filed: Apr. 28, 2003

(65) Prior Publication Data

US 2004/0211880 A1 Oct. 28, 2004

(51) Int. Cl.
*H01J 40/14* (2006.01)

(52) U.S. Cl. ............................. 250/214 R; 250/201.5
(58) Field of Classification Search .......... 250/214 R, 250/201.5, 214.1, 559.45; 324/753, 763, 324/718, 702; 369/53.15, 53.12, 53.1
See application file for complete search history.

(56) References Cited

U.S. PATENT DOCUMENTS

| | | | |
|---|---|---|---|
| 4,875,859 A | 10/1989 | Wong et al. | 434/214 |
| 4,921,347 A | 5/1990 | Wong et al. | 356/73.1 |
| 5,041,997 A | 8/1991 | Hemday et al. | 364/571.01 |
| 5,175,492 A | 12/1992 | Wong et al. | 324/158 |
| 5,442,618 A | 8/1995 | Dewey et al. | 369/124 |
| 5,729,511 A | 3/1998 | Schell et al. | 369/44.27 |
| 5,748,578 A | 5/1998 | Schell | 369/44.14 |
| 5,796,703 A | 8/1998 | Schell et al. | 369/116 |
| 5,828,054 A | 10/1998 | Schell | 250/201.5 |
| 5,878,015 A | 3/1999 | Schell et al. | 369/116 |
| 5,974,007 A | 10/1999 | Getreuer | 369/32 |
| 6,034,364 A | 3/2000 | Schell | 250/201.5 |
| 6,058,081 A | 5/2000 | Schell et al. | 369/44.27 |
| 6,069,857 A | 5/2000 | Schell et al. | 369/54 |
| 6,108,088 A | 8/2000 | Drake et al. | 356/372 |
| 6,122,232 A | 9/2000 | Schell et al. | 369/44.11 |
| 6,188,472 B1 | 2/2001 | Gage et al. | 356/73.1 |
| 6,236,625 B1 | 5/2001 | Schell et al. | 369/13 |
| 6,266,306 B1 | 7/2001 | Schell et al. | 369/44.34 |
| 6,278,665 B1 | 8/2001 | Schell et al. | 369/13 |
| 6,317,391 B1 | 11/2001 | Schell et al. | 369/13 |
| 6,418,097 B1 | 7/2002 | Schell et al. | 369/44.34 |
| 6,434,087 B1 | 8/2002 | Schell et al. | 369/13 |
| 6,490,237 B1 | 12/2002 | Supino | 369/59.1 |
| 6,861,854 B1 * | 3/2005 | Guo et al. | 324/727 |

OTHER PUBLICATIONS

U.S. Appl. No. 10/226,934 entitled "Removable Storage Media Drive Feature Enabling Self Test Without Presence of Removable Media," filed Aug. 23, 2002 by Thomas L. Pratt et al. Assignee: Dell Products L.P. Aug. 23, 2002.
U.S. Appl. No. 10/054,320 entitled "Method For Enabling an Optical Drive to Self–Test Analog Audio Signal Paths When No Disc Is Present," filed Nov. 13, 2001 by David M. Pereira. Assignee: Dell Products L.P. Nov. 13, 2001.

* cited by examiner

*Primary Examiner*—Que T. Le
(74) *Attorney, Agent, or Firm*—Baker Botts L.L.P.

(57) ABSTRACT

A system and method for using a photodiode to self-test an optical drive is disclosed. An optical drive includes a light source that emits a light for interacting with optical media. A photodiode placed adjacent the light source detects a portion of the light, such that the photodiode generates an electrical signal proportional to the light that is detected. A circuit is electrically coupled to the photodiode. The circuit receives the electrical signal and, based on the electrical signal, the circuit tests the operability of the optical drive.

20 Claims, 1 Drawing Sheet

SYSTEM AND METHOD FOR USING A PHOTODIODE TO SELF-TEST AN OPTICAL DRIVE

TECHNICAL FIELD

This disclosure relates in general to the field of computers, and more particularly to a system and method for using a photodiode to self-test an optical drive.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer system is one type of information handling system. Examples of computer systems include servers, personal computers, notebook and laptop computers, workstations and personal digital assistants. Typically, the computer system includes a processor, memory, a display, a keyboard, hard disc storage and one or more input/output ("I/O") devices, such as a floppy drive or an optical drive.

Because optical drives may be shipped to consumers and other manufacturers of computer systems, the optical drives may be prone to damage or defects as a result of the shipping and/or assembly process. Generally, when an optical drive is placed into a computer system, the drive is tested to ensure that the drive is functioning properly. As such, manufacturers devise various testing methods for checking the drive and its related operations.

One such test includes placing test media into the drive and performing a series of tests, such as read and/or write operations. However, through prolonged use the test optical media may deteriorate and become defective. Hence, a test of the optical drive may report the drive as faulty or defective. However, the actual fault or defect may exist in the test media.

Another type of test includes placing a fixed reflective material in the optical drive as a substitute for the test media. However, test method requires the correct placement and alignment of an extra component to the optical drive.

SUMMARY

Thus, a need has arisen for a system and method for testing an optical drive using a photodiode in place of optical media.

A further need has arisen for a system and method for testing the optical drive using an optical drive using a self-test signal pattern.

A further need has arisen for a system and method for tuning an optical drive using a test signal pattern in cooperation with a circuit.

In accordance with the teachings of the present invention, the disadvantages and problems associated with testing an optical drive have been substantially reduced or eliminated. In some embodiments of the present disclosure, an optical drive includes a light source that emits a light for interacting with optical media. A photodiode placed adjacent the light source detects a portion of the light, such that the photodiode generates an electrical signal proportional to the light that is detected. A circuit is electrically coupled to the photodiode. The circuit receives the electrical signal and, based on the electrical signal, the circuit tests the operability of the optical drive.

In other embodiments, the optical drive includes an amplifier. The amplifier is electrically coupled to the circuit. The amplifier may increase the electrical signal from the photodiode.

In another embodiment, the optical drive includes a switch. The switch is electrically coupled between the photodiode and the circuit. The switch includes a first position in which the photodiode is electrically coupled to a chipset in the optical drive. The switch also includes a second position in which the photodiode is electrically coupled to the circuit, such that the electrical signal is received at the circuit.

In a further embodiment, a method of using a photodiode to self-test an optical drive includes emitting a light having a predefined configuration from a light source. The light interacts with optical media placed in the optical drive. The method detects a portion of the light at the photodiode and generates an electrical signal in the photodiode that is proportional to the light that is detected. The method compares the electrical signal with the predefined configuration to self-test the optical drive.

The present disclosure contains a number of important technical advantages. One technical advantage is using a photodiode in place of optical media to test the optical drive. Because many optical drives, or optical drive, generally include one or more photodiodes, testing the optical drive with the photodiode permits the drive to be tested using existing components within the drive. Further, a technician does not have to open each individual drive to insert media. Indeed, the optical drive may be tested using circuits or components already installed within the optical drive.

Another technical advantage includes a system and method for testing the optical drive using an optical drive using a self-test signal pattern. Modulating a light source (e.g., a laser diode) in the optical drive may create a self-test signal pattern that could be detected by the photodiode. A circuit such as a drive self-test module may be used to analyze the signal pattern received at the photodiode and compared it to an expected result. Based on the comparison, the optical drive may be checked for operability problems.

A further technical advantage includes a system and method for tuning an optical drive using a test signal pattern in cooperation with a circuit. Because the drive may be tested using a modulating pattern for the test signal, a circuit may be used to analyze the received signal. Based on the analysis, the circuit may tune or recalibrate one or more components within the optical drive. Thus, an optical drive may be able to correct problems without the need for placing optical media within the drive.

All, some, or none of these technical advantages may be present in various embodiments of the present invention. Other technical advantages will be apparent to one skilled in the art from the following figures, descriptions, and claims.

BRIEF DESCRIPTION OF THE DRAWINGS

A more complete understanding of the embodiments of the present disclosure and advantages thereof may be acquired by referring to the following description taken in conjunction with the accompanying drawings, in which like reference numbers indicate like features, and wherein.

DETAILED DESCRIPTION

Preferred embodiments of the present disclosure and their advantages are best understood by reference to FIGS. 1 through 4, where like numbers are used to indicate like and corresponding parts.

Figure 1:
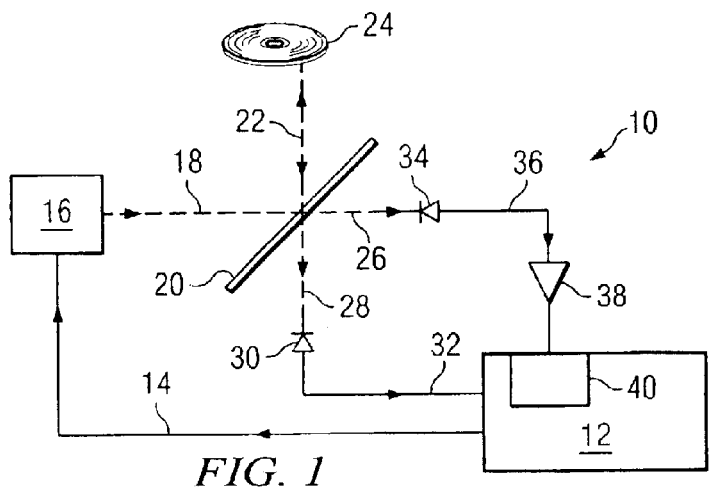
FIG. 1 is a schematic view of an optical drive using a second photodiode to self-test the optical drive according to an example embodiment of the present disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disc drives, one or more network ports for communicating with external devices, as well as various input and output (I/O) devices, such as a keyboard, a mouse, and a video display. The information handling system may also include one or more buses operable to transmit communications between the various hardware components. Referring to FIG. 1, optical drive 10 may form a part of an information handling system such as a computer system. Optical drive 10 may vary depending on the type of optical media 24 that is used with the drive. For example, a compact disc ("CD") drive may only read data from optical media 24 such as a CD-ROM (CD-read only memory). However, if a user desires to have both read and write capabilities, another type of optical drive 10 may be used such as a CD-RW drive that has the capabilities to read from and write to certain optical media such as a CD-R or a CD-RW. Other types of optical drive 10 may use different types of optical media 24. Examples of optical media 24 include a digital video disc ("DVD"), DVD-R, DVD-RW, and any other media suitable for use in optical drive 10.

Optical drive 10 may include chipset 12 that may form part or all of the control circuitry for the operation of optical drive 10. As such, chipset 12 may contain a variety of electrical components such as controls for a laser lens system, disc drive mechanism controls, tracking mechanism controls, and signal processing modules (not expressly shown).

Chipset 12 may also control and provide electrical power to light source 16 via light source connection 14. For example, light source 16 may be a laser diode such as a low power laser diode that emits a laser able to focus on optical media 24 via mirror 20 in order to read/write data from optical media 24. Generally, light source 16 emits the light along light path 18 towards mirror 20.

Typically, mirror 20 forms a part of a lens system within optical drive 10 that enables the light to focus on optical media 24. In some example embodiments, mirror 20 focuses the light to follow focused light path that land the surface of optical media 24 placed in optical drive 10. The light reflected off of optical media 24 may be reflected back reflected path 28 such that the light is detected by first photodiode 30.

In some embodiments, mirror 20 may include a polarized mirrored surface that is able to reflect a large percentage of the light toward optical media 24 along reflected light path 22, while permitting some of the light to pass through mirror 20 along pass-through light path 26. In one example embodiment, mirror 20 is a polarized mirror surface that reflects sixty to ninety percent of the light towards optical media 24, while allowing ten to forty percent of the light to pass through mirror 20 along pass-through light path 26. Typically, the light traveling along pass-through light path 26 is detected by second photodiode 34.

First photodiode 30 and second photodiode 34 may form a part of an optical pick-up mechanism in optical drive 10. Examples of first photodiode 30 and second photodiode 34 may include any type of photodiode, photoelectric semiconductor device, or light detecting and/or measuring device that is able to convert radiant energy, such as light, into electrical energy. For instance, the light that is detected by second photodiode 34 may be converted into an electrical signal that is proportional to the amount of detected light.

First photodiode 30 and second photodiode 34 may be used to detect the light from light source 16 and, generally both, are present in optical drive 10. As such, first photodiode 30 may be used to detect light reflected off of optical media 24, which may be used to read data from optical media 24. Typically, the reflected light, which may be reflected from the pits and lands present on optical media 24, may be received as pulses of light. After first photodiode 30 detects this light, first photodiode 30 may generate a signal proportional to the light that may be sent to chipset 12 via first signal path 32. At chipset 12, the signal may be decoded and redirected to a computer system or any other type of output such as an audio or video output.

Second photodiode 34, also known as a forward facing diode, may be used to detect light directly or indirectly from light source 16. As such, second photodiode 34 may be able to detect light without the need to have optical media 24 present in optical drive 10.

Second photodiode 34 may generate an electrical signal proportional to the detected light. This electrical signal may be then sent to self-test circuit 40. In some example embodiments, self-test circuit 40 forms a part of chipset 12.

However, in alternate embodiments, self-test circuit 40 is a separate component apart from chipset 12 that may test and determine the operability of optical drive 10.

In some embodiments, light from light source 16 is detected at second photodiode 34 after passing through mirror 20. Because mirror 20 may reduce a significant portion of light passing through to second photodiode 34 and the electrical signal generated at second photodiode 34 may be proportional to the amount of detected light, electrical signal sent to self-test circuit 40 via second signal path 36 may pass through amplifier 38.

Amplifier 38, typically, increases the electrical signal generated by second photodiode 34. Because the electrical signal may be amplified, self-test circuit 40 may be programmed to account for this amplification of signal strength.

Generally, amplifier 38 may be an electrical signal amplifier that is compatible with second photodiode 34. Other examples of amplifier 38 may include a pre-amplifier circuit, adjustable amplifier, filtered amplifier, amplifiers with offset features or any other suitable amplifier able to increase a signal strength from photodiode.

Figure 2:
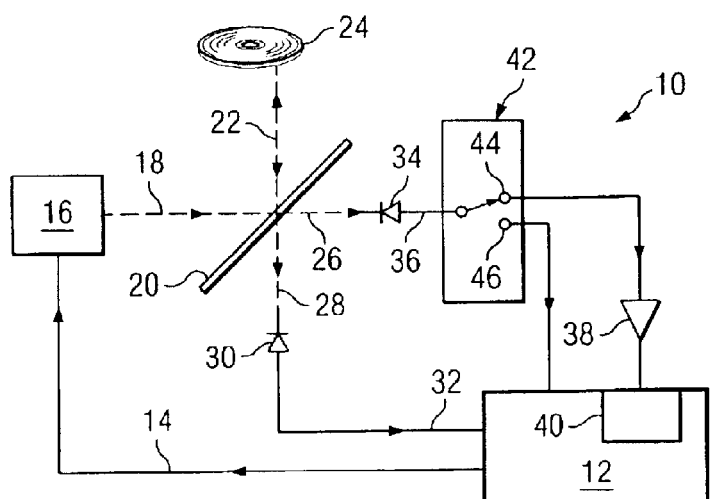
FIG. 2 is a schematic view of the optical drive using the second photodiode and a switch to self-test the optical drive according to an example embodiment of the present disclosure.

FIG. 2 is a schematic view of optical drive 10 using second photodiode 34 and switch 42 to self-test optical drive 10. In certain example embodiments of optical drive 10, second photodiode 34 may serve an additional function within optical drive 10. For example, second photodiode 34 may be used to detect the amount of laser power used during write operations, wherein light source 16 "burns" or writes data onto optical media 24 such as a DVD-RW or a CD-R disc.

As such, optical drive 10 may incorporate switch 42 to selectively couple the electrical signal generated by second photodiode 34 to either a test circuit such as self-test circuit 40, or to a write operation circuitry that may form a part of chipset 12. Switch 42 may include any variety of selective switching device including automatic, manual, mechanical, electrical, pneumatic, optical or any other suitable device that is able to selectively couple the electrical signal to an appropriate component of optical drive 10.

During a write operation, the electrical signal from second photodiode 34 may be routed to a write operation circuitry via chipset connector 46 in switch 42. Thus, an electrical signal from second photodiode 34 may be directed to chipset 40.

However, during a self-test operation, switch 42 may couple second photodiode 34 to self-test circuit 40 via self-test connector 44. Thus, the electrical signal from second photodiode 34 may be directed to self-test circuit 40 or any other suitable self-test circuitry. Because second photodiode 34 may be idle during read operations, in certain embodiments, optical drive 10 may perform self-test operations while optical drive 10 performs read operations. Generally, when using second photodiode 34 to perform a self-test operation on optical drive 10, optical media 24 may or may not be present in optical drive 10.

Figure 3:
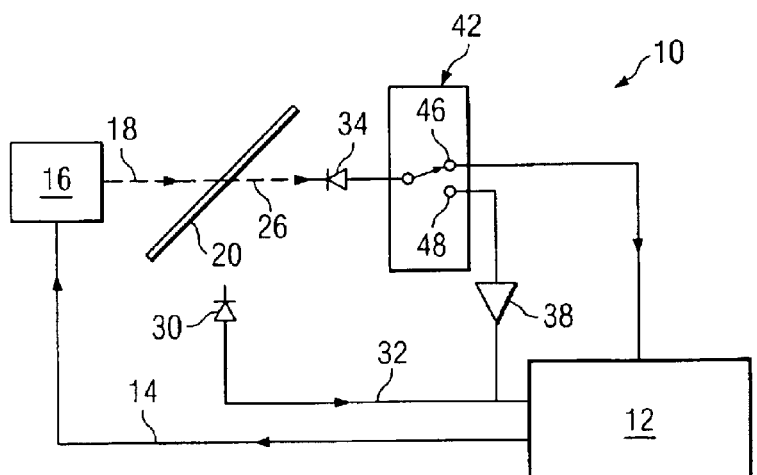
FIG. 3 is a schematic view of the optical drive using the second photodiode and the switch to perform a self-test operation with existing circuitry of a chipset according to an example embodiment of the present disclosure.

FIG. 3 is a schematic view of optical drive 10 using second photodiode 34 and switch 42 to perform a self-test operation with existing circuitry of chipset 12. In some example embodiments, switch 42 may be used to selectively couple the electrical signal from second photodiode 34 to first signal path 32 via circuit connector 48. Although the electrical signal is shown routed through amplifier 38, amplifier 38 may or may not be required to increase the strength or power of the electrical signal. In one particular embodiment, electrical signal is routed through amplifier 38 to increase the signal strength to approximately the signal strength of a signal generated by first photodiode 30 during a read operation. Additionally, in some embodiments, second photodiode 34 may couple directly to first signal path 32 without passing through switch 42.

When the electrical signal from second photodiode 34 is directed to chipset 12 via first signal path 32, chipset 12 may analyze the electrical signal with existing circuitry in optical drive 10, wherein the electrical signal passes into the circuitry used by the signal generated by first photodiode 30. In one example, the electrical signal from second photodiode 34 may simulate data from test media that is used with conventional optical drives. By directing the electrical signal to first signal path 32, the electrical signal may be tested using the existing circuitry in chipset 12. Therefore, optical drive 10 may be tested for operability using existing circuitry.

Figure 4:
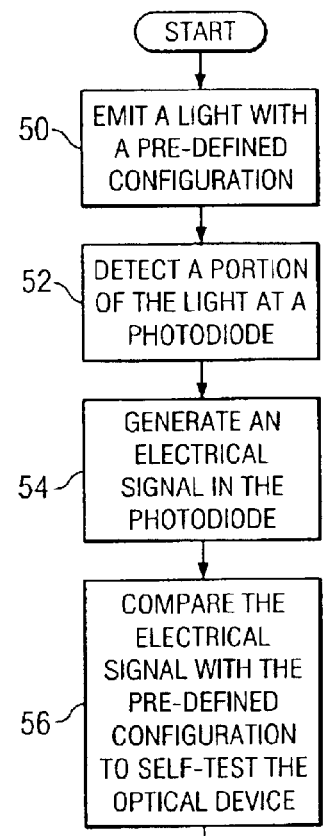
FIG. 4 illustrates a flowchart for using the second photodiode to self-test an optical drive according to an example embodiment of the present disclosure.

FIG. 4 illustrates a flowchart for using second photodiode 32 to self-test optical drive 10. At step 50, light source 16 may emit a light having a predefined configuration. Typically, the predefined configuration includes a test pattern, modulation, or any other suitable variation of the light, such as pulses, that follow a set configuration. In some embodiments, the modulation of the light may pulse in a fashion that simulates test media.

At step 52, the method may detect a portion of the light from light source 16 at second photodiode 34. In some embodiments, a reduced portion of the light is detected at second photodiode 34 after passing through a polarized mirrored surface that reflects a substantial portion of the light towards optical media 24.

At step 54, second photodiode 34 generates an electrical signal based on the light that is detected. Because the electrical signal may be proportional to the amount of detected light, amplifier 38 may be used to increase or boost the electrical signal to a measurable level. Thus, it may be possible to detect a problem with light source 16 or optical drive 10 based on the measurable level of detected light. For example, light source 16 may emit a very low level light that causes second photodiode 34 to generate a very low electrical signal, amplifier 38 may be used to increase the signal to a measurable level that allows self-test circuit 40 to test the operability of optical drive 10.

At step 56, the method compares the electrical signal with the pre-defined configuration to self-test optical drive 10. Because the light from light source 16 is emitted in a pre-defined configuration, the electrical signal generated by second photodiode 34 should conform to the pre-defined configuration since the electrical signal is based on the detected light. Therefore, by comparing the electrical signal to the pre-defined configuration, optical device 10 may be tested for operability.

In some embodiments, the light from light source 16 may include modulation or pulses of light that follows a test pattern such that self-test circuitry 40 may compare the electrical signal to a known pattern or standard and thus, test the operability of optical drive 10. Based on the test, chipset 12, either alone or in conjunction with self-test circuitry 40, may tune or adjust at least one component of optical drive 10.

In other embodiments, a computer system may receive an output from optical drive 10 that is representative of the electrical signal to perform an operability test of optical drive 10. The computer system may test optical drive 10 with the use a computer program, such as a program of instructions stored in memory that is executable by the processor. The computer program either alone or in conjunction with chipset 12 may test a component of optical drive 10. In some instances, the computer program may be used in combination with chipset 12 to tune a component of optical drive 10.

In one particular embodiment, the electrical signal from second photodiode 34 may be routed directly into first signal path 32 via switch 42. Because chipset 12 may perform a comparison of the electrical signal to the pre-defined configuration and thus test optical drive 10 for operability, the electrical signal may include a test signal pattern that simulates optical test media. As such, the test signal pattern may be varied depending on the type of test being performed. For example, the test signal pattern may cause light source 16 to send alternating high power level light pulses followed by low power level light pulses to test the range of detected light.

Once the test signal pattern is received at chipset 12, chipset 12 may compare the test signal pattern to a pre-defined configuration stored the memory of chipset 12. Alternatively, the test signal pattern may be compared to a pre-defined configuration stored on memory in the computer system. In either event, optical drive 10 may be tested for operability using second photodiode 34.

Optical drive 10 may also perform a second self-test for operability. For instance, if one or more components of optical drive 10 were tuned or adjusted as a result of a first self-test, optical drive 10 may perform a second self-test on optical drive 10. In some embodiments, the second self-test is initiated automatically based on whether any adjustment or tuning occurred in the previous test.

Although the present disclosure has been described with respect to a specific embodiment, various changes and modifications will be readily apparent to one skilled in the art. The present disclosure is not limited to the illustrated embodiment, but encompasses such changes and modifications that fall within the scope of the appended claims.

What is claimed is:

1. An optical drive, comprising:
   a light source operable to emit a light for interacting with optical media;
   a photodiode placed adjacent the light source, the photodiode operable to detect a portion of the light, wherein the photodiode generates an electrical signal proportional to the light that is detected;
   a circuit electrically coupled to the photodiode, the circuit operable to receive the electrical signal; and
   based on the electrical signal, the circuit operable to test the operability of the optical drive.

2. The optical drive of claim 1, further comprising a partially transparent reflective surface associated with the optical lens system, wherein the photodiode detects a portion of the light passing through the partially transparent reflective surface.

3. The optical drive of claim 2, wherein the partially transparent reflective surface comprises a polarized mirror.

4. The optical drive of claim 1, further comprising an amplifier electrically coupled to the circuit, the amplifier operable to increase the electrical signal from the photodiode.

5. The optical drive of claim 1, further comprising:
   a switch electrically coupled between the photodiode and the circuit;
   the switch having a first position in which the photodiode is electrically coupled to a chipset in the optical drive; and
   the switch having a second position in which the photodiode is electrically coupled to the circuit, such that the electrical signal is received at the circuit.

6. The optical drive of claim 1, wherein the circuit comprises a self-test electrical component operable to detect problems in the optical drive.

7. The optical drive of claim 1, wherein the circuit comprises an electrical component that forms a part of a chipset within the optical drive.

8. The optical drive of claim 1, wherein the light source comprises a laser diode.

9. An information handling system, comprising:
   a processor;
   memory communicatively coupled to the processor; and
   an optical drive operably coupled to both the processor and the memory, the optical drive including:
     a light source operable to emit a light for interacting with optical media;
     a photodiode placed adjacent the light source, the photodiode operable to detect a portion of the light, wherein the photodiode generates an electrical signal proportional to the detected light;
     a circuit electrically coupled to the photodiode, the circuit operable to receive the electrical signal;
     the circuit including an amplifier electrically coupled to the circuit, the amplifier operable to increase the electrical signal from the photodiode; and
     the circuit operable to test at least one component of the optical drive based on the electrical signal.

10. The information handling system of claim 9, further comprising:
    a switch electrically coupled between the photodiode and the circuit;
    the switch having a first position in which the photodiode is electrically coupled to a chipset in the optical drive; and
    the switch having a second position in which the photodiode is electrically coupled to the circuit, such that the electrical signal is received at the circuit.

11. The information handling system of claim 9, further comprising a program of instructions storable in the memory and executable by the processor, the program of instructions in conjunction with the circuit operable to test at least one component of the optical drive.

12. The information handling system of claim 11, the program of instructions and the circuit cooperating to tune the light from the light source.

13. The information handling system of claim 9, wherein the optical drive comprises a drive operable to use media including a CD ("compact disc"), a CD-ROM, a CD-R (CD-read only), a CD-RW (CD-read and write), a DVD ("digital video disc"), and a DVD-RW drive.

14. A method of using a photodiode to self-test an optical drive, comprising:
    emitting a light having a predefined configuration from a light source, the light operable to interact with optical media placed in the optical drive;
    detecting a portion of the light at the photodiode;
    generating an electrical signal in the photodiode that is proportional to the light that is detected;
    comparing the electrical signal with the predefined configuration to self-test the optical drive.

15. The method of claim 14, further comprising adjusting the light emitted from the light source based on the self-test.

16. The method of claim 14, wherein emitting the light further comprises modulating the light to create a test signal pattern such that the test signal pattern received at the photodiode is compared to an expected signal pattern.

17. The method of claim 14, wherein emitting the light further comprises modulating the light to simulate data from a test optical medium.

18. The method of claim 14, further comprising:
   amplifying the electrical signal;
   electrically coupling the electrical signal to an input for existing circuits within the optical drive; and
   analyzing the electrical signal using the exiting circuits.

19. The method of claim 14, further comprising tuning one or more components within the optical drive based on the self-test.

20. The method of claim 19, further comprising, in response to tuning the one or more components, performing a second self-test within the optical drive.

* * * * *